Dec. 25, 1928.
W. H. WATLINGTON
1,696,702
BRAKE RELEASING DEVICE
Filed Feb. 2, 1927
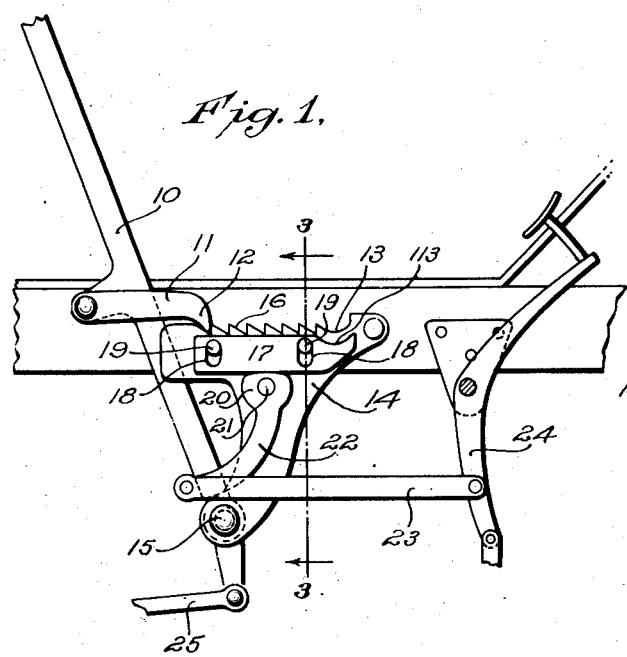
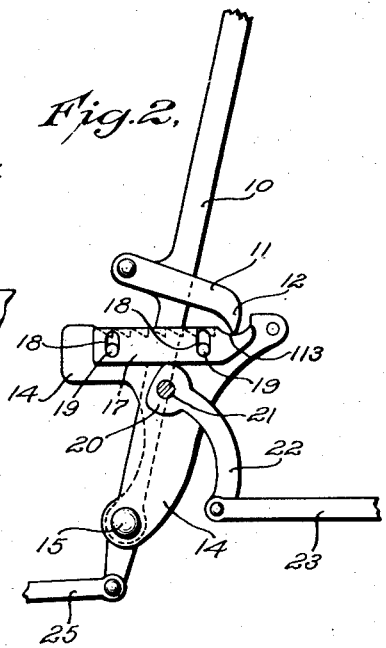
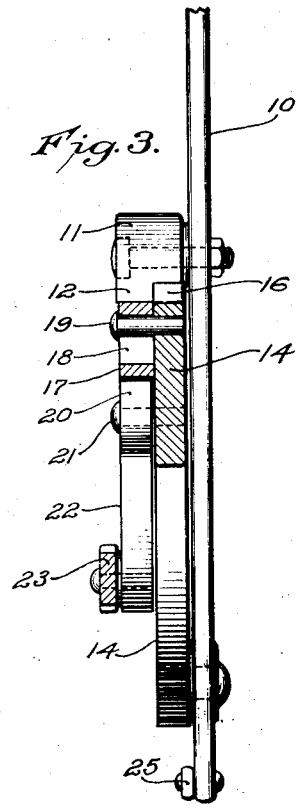
WITNESSES
INVENTOR
W. H. WATLINGTON
BY
ATTORNEY Patented Dec. 25, 1928.

1,696,702

UNITED STATES PATENT OFFICE.

WILLIAM H. WATLINGTON, OF DENVER, COLORADO.

BRAKE-RELEASING DEVICE.

Application filed February 2, 1927. Serial No. 165,422.

My invention relates to a means for automatically releasing the hand or emergency brake of an automobile.

The general object of my invention is to provide a novel and practical means for releasing the brake after throwing of the brake lever to a braking position, and more specifically, to provide for the operation of the brake release by the depression of the clutch pedal so that when the brake is not applied or, that is to say when it is resting in neutral a movement of the clutch pedal will disturb the brake latch.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a side elevation of a brake releasing device embodying my invention showing the parts in the positions when the brake is applied.

Figure 2 is an elevation of a portion of the device shown in Figure 1, illustrating the position of the parts when the brake has been released.

Figure 3 is a transverse vertical section on an enlarged scale on the line 3—3 of Figure 1.

In the illustrated example of my invention a hanger 14 is provided and suitably fixed to the frame of the automobile. The brake lever 10 is pivoted to a pin 15 on the hanger 14 at the lower end. The brake latch 11 has a nose 12 adapted to engage rack teeth 16 on the upper edge of the fixed hanger 14. The nose 12 of latch 11 may rest, when the brake is automatically released, in the depression 13 of the element 14.

For lifting the latch 11 and disengaging the same from the teeth 16 I provide bar 17 having in the illustrated example, vertical slots 18 through which pins 19 extend, said pins being rigid on the element 14. The arrangement is such that bar 17 may rise and fall. For actuating bar 17 to release the brake I provide a cam head 20 on an arm 22 pivoted as at 21 through the cam 20. The arm 22 connects by a link 23 with the clutch pedal 24. The numeral 25 indicates a brake rod.

With the described construction after the brake has been applied by throwing the lever 10 rearwardly and the latch 11 is engaged with one or other of the teeth 16, the brake may be released by disengaging the latch 11 from the teeth 16 by the depression of the clutch pedal 24, which through link 23 will rock the arm 22 and give a turning movement to cam 20 in a direction to engage the latch 11. When the latch 11 has been released from the teeth 16 and the lever 10 is moved to a forward position the nose 12 will rest in the curved depression 13.

It will be observed that there is a depression 113 in the bar 17 corresponding with the depression 13, so that the nose 12 may rest in the depression 13 after the release of the brake.

I would state furthermore that while the illustrated example constitutes a practical embodiment of my invention, I do not limit myself strictly to the exact details herein illustrated, since, manifestly, the same can be considerably varied without departure from the spirit of the invention, as defined in the appended claim.

What I claim is:

In a brake releasing device, in combination with a pivoted brake latch and toothed rack engageable by the latch, a releasing bar movable to engage the brake latch and lift the same out of latching position and means engaging said releasing bar for raising the same to effect disengagement of the latch, said toothed rack and said releasing bar having each a depression in which the end of the latch rests when the brake is in released position.

WILLIAM H. WATLINGTON.